US012607829B2

(12) United States Patent
Kwon et al.

(10) Patent No.:　　US 12,607,829 B2
(45) Date of Patent:　　Apr. 21, 2026

(54) OPTICAL SYSTEM

(71) Applicant: LG INNOTEK CO., LTD., Seoul (KR)

(72) Inventors: Young Man Kwon, Seoul (KR); Sung Min Moon, Seoul (KR); Jin Kwan Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 451 days.

(21) Appl. No.: 18/019,596

(22) PCT Filed: Aug. 4, 2021

(86) PCT No.: PCT/KR2021/010246

§ 371 (c)(1),
(2) Date: Feb. 3, 2023

(87) PCT Pub. No.: WO2022/031017

PCT Pub. Date: Feb. 10, 2022

(65) Prior Publication Data

US 2023/0280568 A1　　Sep. 7, 2023

(30) Foreign Application Priority Data

Aug. 4, 2020　(KR) ........................ 10-2020-0097261

(51) Int. Cl.
G02B 9/60　　(2006.01)
G02B 13/00　　(2006.01)

(52) U.S. Cl.
CPC ........... G02B 13/0045 (2013.01); G02B 9/60 (2013.01); G02B 13/0065 (2013.01)

(58) Field of Classification Search
CPC ... G02B 13/0045; G02B 9/60; G02B 13/0065
See application file for complete search history.

(56) References Cited

U.S. PATENT DOCUMENTS

| | | | |
|---|---|---|---|
| 9,989,741 B1 | 6/2018 | Hsueh et al. | |
| 10,215,968 B2 | 2/2019 | Bae et al. | |
| 10,386,605 B2 | 8/2019 | Chen | |
| 10,732,389 B2 | 8/2020 | Chen | |
| 11,054,618 B2 | 7/2021 | Lee et al. | |

(Continued)

FOREIGN PATENT DOCUMENTS

| | | | | |
|---|---|---|---|---|
| CN | 108254857 A | | 7/2018 | |
| CN | 109358410 A | * | 2/2019 | ......... G02B 13/0065 |

(Continued)

OTHER PUBLICATIONS

CN-109358410-A, ttranslation (Year: 2019).*

*Primary Examiner* — Wen Huang

(74) *Attorney, Agent, or Firm* — Birch, Stewart, Kolasch & Birch, LLP

(57) ABSTRACT

An optical system disclosed in an embodiment of the invention includes an optical path changing member and a plurality of lenses sequentially disposed along an optical axis from an object side to an image side, the light path changing member includes a reflective mirror or a prism, a distance between the plurality of lenses does not change, and a lens closest to an image side of the plurality of lenses has a larger effective aperture than the other lenses.

18 Claims, 2 Drawing Sheets

1000

S1 S2 S3 S4 S5 S6 S7 S8 S9 S10

50 110 200 120 130 140 150 300 500

Object side　　　Image side

(56) References Cited

U.S. PATENT DOCUMENTS

| | | | |
|---|---|---|---|
| 11,106,010 | B2 | 8/2021 | Lee et al. |
| 11,520,123 | B2 | 12/2022 | Chen |
| 11,681,126 | B2 | 6/2023 | Lee et al. |
| 11,789,243 | B2 | 10/2023 | Chen |
| 12,085,698 | B2 | 9/2024 | Lee et al. |
| 12,181,636 | B2 | 12/2024 | Wenren et al. |
| 2007/0024992 | A1 | 2/2007 | Kushida et al. |
| 2015/0212319 | A1 | 7/2015 | Nagano |
| 2018/0017767 | A1 | 1/2018 | Chen |
| 2018/0180847 | A1 | 6/2018 | Yoo |
| 2018/0188501 | A1 | 7/2018 | Lee et al. |
| 2018/0231743 | A1 | 8/2018 | Tang et al. |
| 2019/0056566 | A1 | 2/2019 | Yoo et al. |
| 2019/0094497 | A1* | 3/2019 | Huang ............... G02B 13/0045 |
| 2019/0324233 | A1 | 10/2019 | Chen |
| 2020/0103632 | A1 | 4/2020 | Lee et al. |
| 2020/0319429 | A1 | 10/2020 | Chen |
| 2021/0048628 | A1 | 2/2021 | Shabtay et al. |
| 2021/0325641 | A1 | 10/2021 | Wenren et al. |
| 2021/0356712 | A1 | 11/2021 | Lee et al. |
| 2022/0308319 | A1 | 9/2022 | Chen |
| 2023/0273410 | A1 | 8/2023 | Lee et al. |
| 2024/0004165 | A1 | 1/2024 | Chen |
| 2024/0418966 | A1 | 12/2024 | Lee et al. |

FOREIGN PATENT DOCUMENTS

| | | |
|---|---|---|
| CN | 111239974 A | 6/2020 |
| CN | 111308672 A | 6/2020 |
| CN | 111352212 A | 6/2020 |
| JP | 60-260014 A | 12/1985 |
| JP | 7-151993 A | 6/1995 |
| JP | 2007-34103 A | 2/2007 |
| JP | 2007-34314 A | 2/2007 |
| JP | 6341442 B2 | 6/2018 |
| JP | 2021-32908 A | 3/2021 |
| KR | 10-2018-0032058 A | 3/2018 |
| KR | 10-2018-0076894 A | 7/2018 |
| KR | 10-2019-0020421 A | 3/2019 |
| KR | 10-2019-0057022 A | 5/2019 |

* cited by examiner

1000

OPTICAL SYSTEM

CROSS REFERENCE TO RELATED APPLICATIONS

This application is the National Phase of PCT/KR2021/010246 filed on Aug. 4, 2021, which claims priority under 35 U.S.C. § 119(a) to Patent Application No. 10-2020-0097261 filed in the Republic of Korea on Aug. 4, 2020, all of which are hereby expressly incorporated by reference into the present application.

TECHNICAL FIELD

Embodiments of the invention are directed to optics for improved optical performance.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement. The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties.

When the back focal length (BFL) of the optical system is increased, the light incident on the optical system is reflected on the inner surface of the instrument including the optical system, and may occurred as a phenomenon such as flare or ghost. Therefore, a new optical system capable of solving the above problems is required.

DISCLOSURE

Technical Problem

Embodiments provide an optical system with improved optical properties.

Embodiments provide an optical system with improved telescopic performance.

Technical Solution

An optical system according to an embodiment of an invention comprises a light path changing member and a plurality of lenses sequentially disposed along an optical axis from an object side to an image side, the light path changing member includes a reflective mirror or a prism, and a distance between the plurality of lenses does not change, and a lens closest to the image side among the plurality of lenses has an effective aperture larger than that of the other lenses.

According to an embodiment of the invention, the plurality of lenses may include first to fifth lenses sequentially disposed along the optical axis in a direction from the object side to the image side. A size of the effective aperture of each of the first lens and the fifth lens may satisfy Equation 1 below.

$$0.8 < CA11/CA51 < 2$$

$$0.8 < CA12/CA52 < 2 \qquad \text{[Equation 1]}$$

(In Equation 1, CA11 means a size of an effective aperture on an object-side surface of the first lens, and CA12 means a size of an effective aperture on an image-side surface of the first lens. In addition to, CA51 means a size of an effective aperture on an object-side surface of the fifth lens, and CA52 means a size of an effective aperture on an image-side surface of the fifth lens.)

According to an embodiment of the invention, the size of the effective aperture of the first lens may be the largest among the sizes of the effective apertures of the first to fourth lenses. When a distance in a direction of the optical axis from the image-side surface of the fifth lens to the image sensor is defined as a back focal length (BFL), Equation 2 below may be satisfied.

$$0 < CA/BFL < 1 \qquad \text{[Equation 2]}$$

(In Equation 2, CA is a size of an effective aperture of the object-side surface or image-side surface of one lens selected from the first to fifth lenses.)

According to an embodiment of the invention, when a distance in a direction of the optical axis from the object-side surface of the first lens to the image sensor is defined as a total track length (TTL), Equation 3 below may be satisfied.

$$3 < TTL/BFL < 4.5 \qquad \text{[Equation 3]}$$

According to an embodiment of the invention, an effective focal length (EFL) of the optical system may be greater than 10 mm. The optical system may have a F-number smaller than 3.8. A chief ray incidence angle (CRA) of the optical system may be smaller than 40 degrees. The first lens may have positive refractive power. The fifth lens may have positive refractive power. An object-side surface of the third lens may have an inflection point.

An optical system according to an embodiment of the invention includes a light path changing member, a plurality of lenses, and an image sensor sequentially disposed along an optical axis from an object side to an image side, wherein the light path changing member includes a reflective mirror or a prism, when a distance between the plurality of lenses does not change and a distance in the optical axis direction from an image-side surface of the lens closest to the image sensor among the plurality of lenses to the image sensor is defined as BFL (Back focal length), the following Equation 4 may be satisfied.

$$0.5 < ImgH/BFL < 1.5 \qquad \text{[Equation 4]}$$

(In Equation 4, ImgH means a value of ½ of a diagonal length of the effective region of the image sensor.)

Advantageous Effects

An optical system according to an embodiment of the invention may have improved optical characteristics. In detail, the optical system may include the plurality of lenses, and an effective aperture of a last lens closest to the image sensor may be greater than an effective aperture of a first lens closest to the object side. In particular, the effective aperture of the last lens may be the largest among the plurality of lenses, and thus improved optical characteristics may be obtained when designing a zoom lens having image sensors of various sizes, such as small to large.

The optical system according to the embodiment of the invention may minimize or prevent occurrence of phenomena such as flare and ghost. In detail, the optical system may have a relatively small BFL value. Accordingly, it is possible to minimize or prevent light incident on the optical system from being reflected on a structure between the last lens and the image sensor. In addition, the optical system may easily correct the CRA (Chief Ray Angle) value, so it may have improved optical characteristics.

BEST MODE

Figure 1:
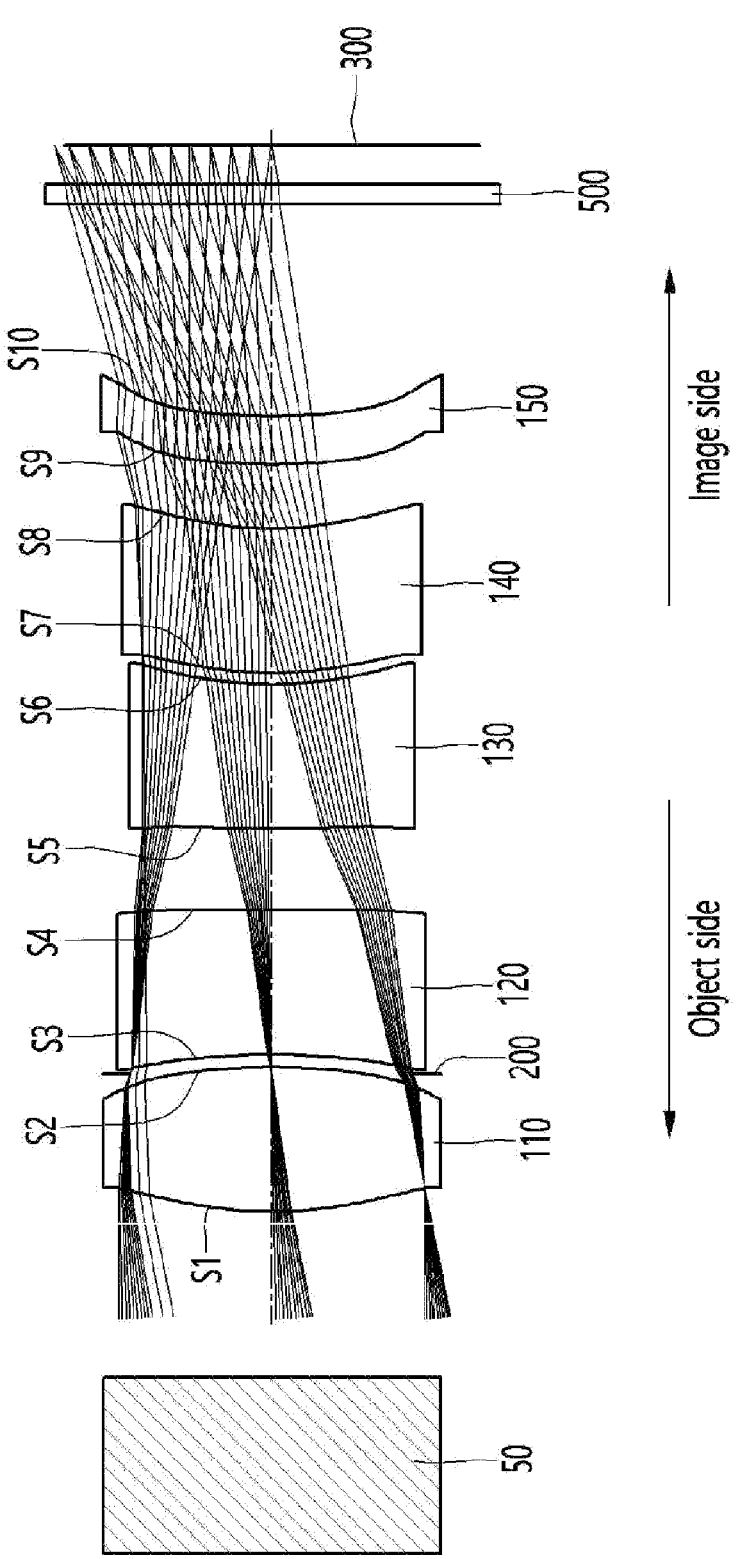
FIG. 1 is a configuration diagram of an optical system according to an embodiment.

Hereinafter, preferred embodiments of the invention will be described in detail with reference to the accompanying drawings. However, a technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, the convex surface of the lens may mean that the lens surface of a region corresponding to the optical axis has a convex shape, and the concave surface of the lens may mean that the lens surface of a region corresponding to the optical axis has a concave shape. In addition, the "object-side surface" may refer to a surface of the lens facing the object side with respect to the optical axis, and the "image-side surface" may refer to the surface of the lens facing the imaging surface with respect to the optical axis. In addition, the vertical direction may mean a direction perpendicular to the optical axis, and the end of the lens or lens surface may mean the most end of an effective region of the lens through which incident light passes.

Figure 2:
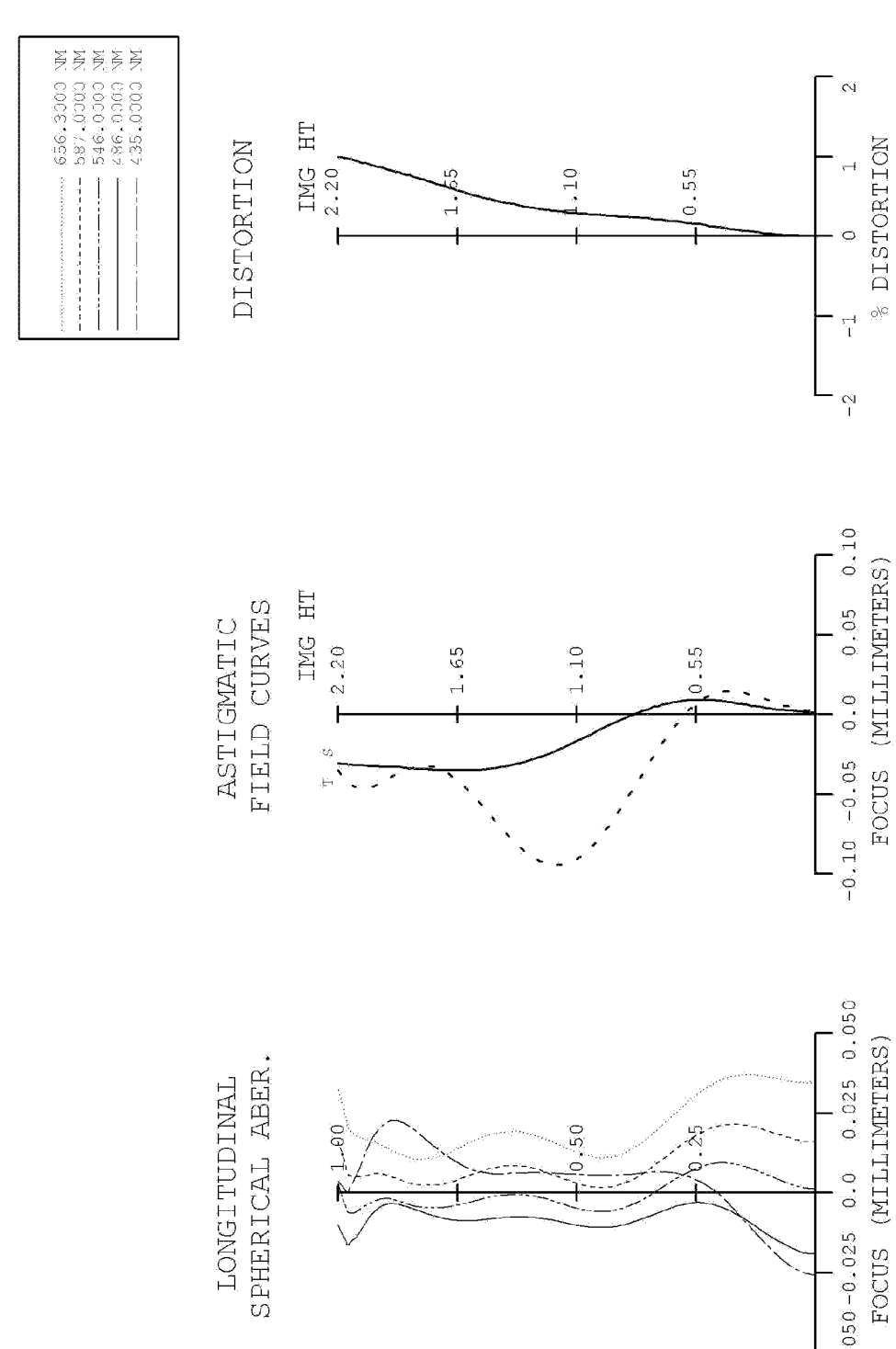
FIG. 2 is a graph showing an aberration diagram of an optical system according to an embodiment.

FIG. 1 is a configuration diagram of an optical system according to an embodiment, and FIG. 2 is a graph showing an aberration diagram of the optical system according to an embodiment.

Referring to FIG. 1, an optical system 1000 according to an embodiment of the invention may include a plurality of lenses. For example, the optical system 1000 may include four or more lenses. In detail, the optical system 1000 may include 5 or more lenses.

The optical system 1000 may include a first lens 110, a second lens 120, a third lens 130, a fourth lens 140, and a fifth lens 150 sequentially arranged from the object side to the image side. The optical system 1000 may include a filter 500 and an image sensor 300 in an upward direction of the plurality of lenses 110, 120, 130, 140, and 150. The first to fifth lenses 110, 120, 130, 140, and 150 may be sequentially arranged along the optical axis of the optical system 1000. Light corresponding to image information of an object may pass through the first to fifth lenses 110, 120, 130, 140, and 150 sequentially and be incident on the image sensor 300.

The optical system 1000 may further include an optical path changing member 50. The light path changing member 50 may change the path of light by reflecting light incident from the outside. The light path changing member 50 may include a reflective mirror or a prism. For example, the light path changing member 50 may include a right-angle prism. When the light path changing member 50 includes a right-angle prism, the light path changing member 50 may change the path of light by reflecting the path of incident light at an angle of 90 degrees. The light path changing member 50 may be disposed closer to the object side than the first to fifth lenses 110, 120, 130, 140, and 150. That is, the optical system 1000 includes the optical path changing member 50, a first lens 110, a second lens 120, a third lens 130, a fourth lens 140, a fifth lens 150, a filter 500 and an image sensor 300 sequentially disposed along the optical axis OA from the object side toward the image side. The light path changing member 50 may change the path of light in a set direction by reflecting light incident from the outside. That is, the light path changing member 50 may change the path of the light incident to the light path changing member 50 toward the first to fifth lenses 110, 120, 130, 140, and 150.

Each of the first to fifth lenses 110, 120, 130, 140, and 150 may include an effective region and an ineffective region. The effective region may be a region through which light incident on the lens passes. That is, the effective region may be a region in which the incident light is refracted to implement optical characteristics. The non-effective region may be arranged around the effective region. The ineffective region may be a region in which the light is not incident. That is, the non-effective region may be a region unrelated to the optical characteristics. Also, the non-effective region may be a region fixed to a barrel (not shown) accommodating the lens. The optical system 1000 according to an embodiment of the invention may include an aperture stop 200 for adjusting the amount of incident light. The aperture stop 200 may be disposed between two lenses selected from among the first to fifth lenses 110, 120, 130, 140, and 150. For example, the aperture stop 200 may be disposed between the first lens 110 and the second lens 120. At least one lens of the first to fifth lenses 110, 120, 130, 140, and 150 may serve as a aperture stop. For example, one lens surface selected from among the first to fifth lenses 110, 120, 130, 140, and 150 may serve as an aperture stop to adjust the amount of light incident on the optical system 1000.

The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light.

The image sensor 300 may detect light. In detail, the image sensor 300 may detect light sequentially passing through the first to fifth lenses 110, 120, 130, 140, and 150. The image sensor 300 may include a charge coupled device (CCD) or complementary metal oxide semiconductor (CMOS).

Hereinafter, the plurality of lenses will be described in detail.

The first lens 110 may have positive (+) refractive power. The first lens 110 may include a plastic or glass material. For example, the first lens 110 may be made of a plastic material. The first lens 110 may include a first surface 51 defined as an object-side surface and a second surface S2 defined as an image-side surface. The first surface S1 may be convex, and the second surface S2 may be convex. That is, the first lens 110 may have a convex shape on both sides. At least one of the first surface S1 and the second surface S2 may be an aspherical surface. For example, both the first surface S1 and the second surface S2 may be aspherical.

The second lens 120 may have negative (−) refractive power. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may be concave, and the fourth surface S4 may be convex. That is, the second lens 120 may have a meniscus shape convex to the image side. At least one of the third and fourth surfaces S3 and S4 may be an aspherical surface. For example, both the third surface S3 and the fourth surface S4 may be aspheric surfaces.

The third lens 130 may have negative (−) refractive power. The third lens 130 may include a plastic or glass material. For example, the third lens 130 may be made of a plastic material. The third lens 130 may include a fifth surface S5 defined as an object-side surface and a sixth surface S6 defined as an image-side surface. The fifth surface S5 may be concave, and the sixth surface S6 may be concave. That is, the third lens 130 may have a concave shape on both sides. Also, the third lens 130 may have an inflection point. In detail, an inflection point may be formed on the fifth surface S5 of the third lens 130. At least one of the fifth surface S5 and the sixth surface S6 may be an aspherical surface. For example, both the fifth surface S5 and the sixth surface S6 may be aspheric surfaces.

The fourth lens 140 may have positive (+) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may be convex, and the eighth surface S8 may be concave. That is, the fourth lens 140 may have a meniscus shape convex toward the object side. At least one of the seventh surface S7 and the eighth surface S8 may be an aspheric surface. For example, both the seventh surface S7 and the eighth surface S8 may be aspheric surfaces.

The fifth lens 150 may have positive (+) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may be convex, and the ninth surface S9 may be concave. That is, the fifth lens 150 may have a meniscus shape convex toward the object side. At least one of the ninth surface S9 and the tenth surface S10 may be an aspherical surface. For example, both the ninth surface S9 and the tenth surface S10 may be aspheric surfaces.

The first to fifth lenses 110, 120, 130, 140, and 150 may have a set effective aperture (e.g., clear aperture). For example, each of the first to tenth surfaces S1, S2, S3, S4, S5, S6, S7, S8, S9, and S10 may have a set effective aperture.

Among the first to fifth lenses 110, 120, 130, 140, and 150, the fifth lens 150 closest to the image sensor 300 may have an effective aperture larger than the effective apertures of the first to fourth lenses 110, 120, 130, and 140. For example, the effective apertures of the ninth surface S9 and the tenth surface S10 of the fifth lens 150 may be larger than the effective apertures of the first to eighth surfaces 51, S2, S3, S4, S5, S6, and S7, and S8. The first lens 110 may have the largest effective aperture among the first to fourth lenses 110, 120, 130, and 140. For example, the effective apertures of the first surface S1 and the second surface S2 of the first lens 110 may be larger than the effective apertures of the third to eighth surfaces S3, S4, S5, S6, S7, and S8.

The second lens 120 may have an effective aperture larger than the effective apertures of the third lens 130 and the fourth lens 140. For example, the effective apertures of the third and fourth surfaces S3 and S4 of the second lens 120 may be larger than the effective apertures of the fifth to eighth surfaces S5, S6, S7, and S8 of the third and fourth lenses 130 and 140. The effective aperture of the fourth lens 140 may be larger than an effective aperture of the third lens 130. For example, the effective apertures of the seventh and eighth surfaces S7 and S8 of the fourth lens 140 may be larger than the effective apertures of each of the fifth and sixth surfaces S5 and S6 of the third lens 130.

The optical system 1000 according to an embodiment of the invention may satisfy at least one of equations described below. Accordingly, when the optical system 1000 according to the embodiment satisfies at least one of the following equations, it may have improved optical characteristics.

$$0.8 < CA11/CA51 < 2$$

$$0.8 < CA12/CA52 < 2 \qquad \text{[Equation 1]}$$

In Equation 1, CA11 means the size of the effective aperture of the object-side surface (first surface S1) of the first lens 110, and CA12 means the size of the effective aperture of the image-side surface (second surface S2) of the first lens 110. In addition, CAM means the size of the effective aperture of the object-side surface (ninth surface S9) of the fifth lens 150, and CA52 means the size of the effective aperture of the image-side surface (tenth surface S10) of the fifth lens 150.

In detail, the effective aperture of the first lens 110 and the effective aperture of the fifth lens 150 may satisfy Equation 1-1 below.

$$0.8 < CA11/CA51 < 1.8$$

$$0.8 < CA12/CA52 < 1.8 \qquad \text{[Equation 1-1]}$$

In more detail, the effective aperture of the first lens 110 and the effective aperture of the fifth lens 150 may satisfy Equation 1-2 below.

$$0.8 < CA11/CA51 < 1.5$$

$$0.8 < CA12/CA52 < 1.5 \qquad \text{[Equation 1-2]}$$

$$0 < CA/BFL < 1 \qquad \text{[Equation 2]}$$

In Equation 2, CA means the size of the effective aperture of the object-side surface or the image-side surface of any one lens selected from among the first to fifth lenses 110, 120, 130, 140, and 150. Further, BFL (Back focal length) means the distance from the image-side surface (tenth surface S10) of the fifth lens 150 to the image sensor 300 in a direction of the optical axis.

In detail, the effective aperture and BFL of the first to fifth lenses 110, 120, 130, 140, and 150 may satisfy Equation 2-1 below.

$$0.3 < CA/BFL < 1 \qquad \text{[Equation 2-1]}$$

In more detail, the effective aperture and BFL of the first to fifth lenses 110, 120, 130, 140, and 150 may satisfy Equation 2-2 below.

$$0.3 < CA/BFL < 0.8 \qquad \text{[Equation 2-2]}$$

$$3 < TTL/BFL < 5 \qquad \text{[Equation 3]}$$

In Equation 3, total track length (TTL) means the distance from the object-side surface (first surface S1) of the first lens 110 to the image sensor 300 in the optical axis direction.

$$0.5 < ImgH/BFL < 1.5 \qquad \text{[Equation 4]}$$

In Equation 4, ImgH means a value of ½ of the length of the effective region of the image sensor 300 in the diagonal direction. That is, the ImgH means a distance in a vertical direction from the optical axis of the upper surface of the image sensor 300 to a region of 1 field.

In more detail, the ImgH and the BFL may satisfy Equation 4-1 below.

$$0.5 < ImgH/BFL < 1 \qquad \text{[Equation 4-1]}$$

$$EFL > 10 \text{ mm} \qquad \text{[Equation 5]}$$

In Equation 5, EFL means the effective focal length of the optical system 1000.

$$F\text{-number} < 3.8 \qquad \text{[Equation 6]}$$

In Equation 6, F-number means a numerical value representing the brightness of the optical system.

$$CRA < 40 \qquad \text{[Equation 7]}$$

In Equation 7, CRA (Chief Ray Angle) means an incident angle of a chief ray incident on the image sensor 300.

$$2 < CT1/CT5 < 4 \qquad \text{[Equation 8]}$$

In Equation 8, CT1 means the thickness of the center of the first lens 110, and CT5 means the thickness of the center of the fifth lens 150.

$$|f5| > |f1| + |f2| + |f3| + |f4| \qquad \text{[Equation 9]}$$

In Equation 9, f1 to f5 means focal lengths of the first to fifth lenses 110, 120, 130, 140, and 150, respectively. The absolute value of the focal length f5 of the fifth lens 150 may be greater than the sum of absolute values of the focal lengths f1, f2, f3, and f4 of the first to fourth lenses 110, 1201, 130, and 140.

$$20 < f5/EFL < 50 \qquad \text{[Equation 10]}$$

In Equation 10, f5 means the focal length of the fifth lens 150, and EFL means the effective focal length of the optical system 1000.

$$Z = \frac{cY^2}{1 + \sqrt{1 - (1+K)c^2 Y^2}} + \qquad \text{[Equation 11]}$$
$$AY^4 + BY^6 + CY^8 + DY^{10} + EY^{12} + FY^{14} + \cdots$$

In Equation 10, Z is Sag value, and may mean a distance in the optical axis direction from an arbitrary position on the aspherical surface to the apex of the aspheric surface. Also, Y may mean a distance in a direction perpendicular to the optical axis from an arbitrary position on the aspherical surface to the optical axis. Also, c may mean the curvature of the lens, and K may mean the conic constant. Also, A, B, C, D, E, and F may mean aspheric constants.

The optical system 1000 according to the embodiment may satisfy at least one of Equations 1 to 9. In this case, the optical system 1000 may have improved optical characteristics. In detail, when the optical system 1000 satisfies at least one of the above-described equations, it is possible to prevent a characteristic deterioration phenomenon, such as a flare or a ghost, which occurs when the light incident on the optical system 1000 is reflected by a mechanism accommodating the optical system 1000 from occurring.

Table 1 shows data of lenses according to an embodiment of the invention.

TABLE 1

| Lens | Surface | Radius of curvature | Thickness/ Distance | Effective aperture | Refractive index | Abbe number |
|------|---------|---------------------|---------------------|--------------------|------------------|-------------|
| Lens 1 | S1 | 4.043 | 1.5 | 1.55 | 1.5345 | 55.677 |
|  | S2 | −8.1302 | 0.1324 | 1.4863638 |  |  |
| Lens 2 | S3 | −7.3286 | 1.5 | 1.416846 | 1.6397 | 23.262 |
|  | S4 | −384.7888 | 0.8503 | 1.3826056 |  |  |

TABLE 1-continued

| Lens | Surface | Radius of curvature | Thickness/ Distance | Effective aperture | Refractive index | Abbe number |
|------|---------|---------------------|---------------------|--------------------|--------------------|-------------|
| Lens 3 | S5 | 17.482107 | 1.5 | 1.3135073 | 1.5345 | 55.677 |
| | S6 | 3.8785 | 0.116989268 | 1.3031867 | | |
| Lens 4 | S7 | 3.4444726 | 1.5 | 1.3192926 | 1.6397 | 23.262 |
| | S8 | 3.2521355 | 0.667342341 | 1.3771759 | | |
| Lens 5 | S9 | 6.2858121 | 0.5016011 | 1.5669996 | 1.5345 | 55.677 |
| | S10 | 6.2822957 | | 1.5378562 | | |

Table 2 below shows the characteristics of an optical system and lenses according to an embodiment of the invention.

TABLE 2

| Item | Embodiment |
|------|------------|
| TTL | 11.08676 |
| F-number | 3.4647 |
| EFL | 10.7407 |
| BFL | 2.818 |
| ImgH | 2.051 |
| f1 | 5.256428 |
| f2 | −11.58088 |
| f3 | −9.65706 |
| f4 | 43.734218 |
| f5 | 428.46201 |

Table 1 shows the radius of curvature of the first to fifth lenses 110, 120, 130, 140, and 150, the thickness (mm) of each lens, the distance (mm) between the lenses, the refractive index and Abbe number. Referring to Table 1, the refractive indices of the first lens 110, the third lens 130, and the fifth lens 150 may be equal to each other, and the refractive indices of the second lens 120 and the fourth lens 140 may be equal to each other. In this case, the refractive Abbe numbers of the first lens 110, the third lens 130, and the fifth lens 150 may be equal to each other, and the Abbe numbers of the second lens 120 and the fourth lens 140 may be equal to each other. At this time, the Abbe numbers of the first lens 110, the third lens 130, and the fifth lens 150 may be greater than the Abbe numbers of the second lens 120 and the fourth lens 140.

Table 2 relates to the characteristics of the optical system 1000 according to the embodiment, and in Table 2, the total track length (TTL) is the distance (mm) on the optical axis from the apex of the object-side surface (first surface S1) of the first lens 110 to the upper surface of the image sensor 300, and EFL (effective focal length) means the focal length (mm) of the optical system 1000 including the first to fifth lenses 110, 120, 130, 140, and 150. And, BFL (Back focal length) may mean the distance (mm) on the optical axis direction from the image-side surface (tenth surface S10) of the fifth lens 150 to the image sensor 300, each of f1 to f5 may mean a focal length (mm) of each of the first to fifth lenses 110, 120, 130, 140, and 150. Referring to Table 2, the fifth lens 150 may have the largest focal length value among the first to fifth lenses 110, 120, 130, 140, and 150.

In the optical system 1000 according to the embodiment, the value of the aspherical surface coefficient of each lens is shown in Table 3.

TABLE 3

| | K | A | B | C | D |
|-----|----------|---------------|--------------|---------------|--------------|
| S1 | −4.624774 | −0.226312E−02 | 0.489390E−02 | −0.509701E−02 | 0.217648E−02 |
| S2 | 0.000000 | −0.419606E−01 | 0.604368E−01 | −0.470338E−01 | 0.138559E−01 |
| S3 | −7.463160 | −0.232627E−01 | 0.527822E−01 | −0.444088E−01 | 0.151247E−01 |
| S4 | −99.000000 | 0.119356E−02 | 0.445158E−0 | −0.108605E−01 | 0.641443E−02 |
| S5 | −99.000000 | 0.214541E−02 | −0.365989E−01 | 0.624896E−01 | −0.628915E−01 |
| S6 | −44.256666 | 0.637372E−01 | −0.995684E−01 | 0.171046E+00 | −0.906703E−01 |
| S7 | −99.000000 | 0.114492E+00 | −0.318890E+00 | 0.628853E+00 | −0.788570E+00 |
| S8 | 0.684650 | −0.230664E−01 | −0.204520E−01 | 0.756834E−01 | −0.120926E+00 |
| S9 | 0.000000 | 0.000000E+00 | 0.000000E+00 | 0.000000E+00 | 0.000000E+00 |
| S10 | 0.000000 | 0.000000E+00 | 0.000000E+00 | 0.000000E+00 | 0.000000E+00 |

| | E | F | G | H | J |
|-----|---------------|---------------|---------------|---------------|---------------|
| S1 | −0.566567E−03 | 0.558957E−04 | 0.000000E+00 | 0.000000E+00 | 0.000000E+00 |
| S2 | 0.375169E−03 | −0.122076E−02 | 0.278259E−03 | −0.204382E−04 | 0.000000E+00 |
| S3 | −0.146984E−02 | −0.296560E−03 | 0.625074E−04 | 0.000000E+00 | 0.000000E+00 |
| S4 | −0.599468E−03 | −0.179139E−02 | 0.109799E−02 | −0.196984E−03 | 0.000000E+00 |
| S5 | 0.298347E−01 | −0.531098E−02 | 0.000000E+00 | 0.000000E+00 | 0.000000E+00 |
| S6 | −0.160399E+00 | 0.293791E+00 | −0.198733E+00 | 0.636119E−01 | −0.805047E−02 |
| S7 | 0.602565E+00 | −0.270609E+00 | 0.651563E−01 | −0.643303E−02 | 0.000000E+00 |
| S8 | 0.106326E+00 | −0.524879E−01 | 0.135195E−01 | −0.139956E−02 | 0.000000E+00 |
| S9 | | | | | |
| S10 | | | | | | indices of the first lens 110, the third lens 130, and the fifth lens 150 may be smaller than the refractive indices of the second lens 120 and the fourth lens 140.

Table 4 shows the values of Equations 1 to 10 applied to the optical system according to the embodiment of the invention.

TABLE 4

|  | Equation | Embodiment |
|---|---|---|
| Equation 1 | 0.8 < CA11/CA51 < 2 | CA11/CA51 = 0.989 |
|  | 0.8 < CA12/CA52 < 2 | CA12/CA52 = 0.966 |
| Equation 2 | 0 < CA/BFL < 1 | Satisfied with all |
|  |  | first to fifth lenses |
| Equation 3 | 3 < TTL/BFL < 5 | TTL/BFL = 3.93 |
| Equation 4 | 0.5 < ImgH/BFL < 1.5 | ImgH/BFL = 0.727 |
| Equation 5 | EFL > 10 mm | Satisfaction |
| Equation 6 | F-number < 3.8 | Satisfaction |
| Equation 7 | CRA < 40 | <40 |
| Equation 8 | 2 < CT1/CT5 < 4 | CT1/CT5 = 2.99 |
| Equation 9 | |f5| > |f1| + |f2| + |f3| + |f4| | 428.462 > 80.969 |
| Equation 10 | 20 < f5/EFL < 50 | f5/EFL = 39.891 |

Table 4 is the value of the optical system 1000 for the above equations. Referring to Table 4, it may be seen that the optical system 1000 according to the embodiment satisfies at least one of Equations 1 to 9. In detail, it may be seen that the optical system 1000 satisfies all of Equations 1 to 10. Accordingly, the optical system 1000 according to the embodiment may have aberration characteristics as shown in FIG. 2. In detail, FIG. 2 is a graph showing an aberration diagram of an optical system 1000 according to an embodiment, in which spherical aberration, astigmatic field curves, and distortion are measured from left to right. In FIG. 2, X axis may represent a focal length (mm) and distortion (%), and the Y axis may represent the height of an image sensor. Also, a graph of spherical aberration is a graph of light in a wavelength band of 435 nm, 486 nm, 546 nm, 587 nm, and 656.3 nm, and a graph of astigmatism and distortion is a graph of light of a wavelength band of 546 nm. The optical system 1000 according to an embodiment of the invention may have improved optical characteristics. In detail, in the optical system 1000, the effective aperture of the fifth lens 150 closest to the image sensor 300 may be larger than the effective aperture of the first lens 110 closest to the object side, thereby improving optical characteristics. In particular, since the effective aperture of the fifth lens 150 is the largest among the plurality of lenses, improved optical characteristics may be obtained when designing a zoom lens having image sensors 300 of various sizes, such as small to large. In addition, when the optical system 1000 is applied as a telephoto lens, improved optical characteristics may be obtained.

The optical system may have improved optical characteristics by having a relatively small Back focal length (BFL) value. In detail, as the distance BFL between the image sensor 300 and the fifth lens 150 has a relatively small value, light incident to the optical system 1000 may be prevented or minimized from being reflected on a structure between the fifth lens 150 and the image sensor 300. Accordingly, the optical system 1000 according to the embodiment may have improved optical characteristics by easily correcting a CRA value, for example, an angle of light passing through the fifth lens 150 and incident on the image sensor 300.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:
   an optical path changing member and a plurality of lenses sequentially disposed along an optical axis from an object side toward an image side,
   wherein the plurality of lenses includes first to fifth lenses sequentially disposed along the optical axis in a direction from the object side toward the image side,
   wherein the optical path changing member includes a reflective mirror or a prism,
   wherein a distance between the plurality of lenses does not change,
   wherein the fifth lens closest to an image sensor of the plurality of lenses has a larger effective aperture than the other lenses,
   wherein an object-side surface of the first lens closest to the optical path changing member has a convex shape on the optical axis,
   wherein an image-side surface of the fifth lens has a concave shape on the optical axis,
   wherein the fifth lens has a positive refractive power,
   wherein the optical system consists of five lenses,
   wherein a center thickness of the first lens is CT1,
   wherein a center thickness of the fifth lens is CT5, and
   wherein the following Condition is satisfied:

$$2 < CT1/CT5 < 4. \qquad \text{[Condition]}$$

2. The optical system of claim 1, wherein a size of an effective aperture of each of the first lens and the fifth lens satisfies Condition 1 below:

$$0.8 < CA11/CA51 < 2$$

$$0.8 < CA12/CA52 < 2 \qquad \text{[Condition 1]}$$

(In Condition 1, CA11 means a size of an effective aperture of the object-side surface of the first lens, and CA12 means a size of an effective aperture of an image-side surface of the first lens, CA51 is a size of an effective aperture of an object-side surface of the lens the fifth lens, and CA52 means a size of an effective aperture of an image-side surface of the fifth lens).

3. The optical system of claim 2, wherein the size of the effective aperture of the first lens is the largest among sizes of effective apertures of the first to fourth lenses.

4. The optical system of claim 2, wherein a distance in a direction of the optical axis from the image-side surface of the fifth lens to the image sensor is BFL (Back focal length), and
   wherein the following Condition 2 is satisfied:

$$0 < CA/BFL < 1 \qquad \text{[Condition 2]}$$

(In Condition 2, CA is a size of an effective aperture of an object-side surface or an image-side surface of one lens selected from the first to fifth lenses).

5. The optical system of claim 4, wherein a distance in a direction of the optical axis from the object-side surface of the first lens to the image sensor is a total track length (TTL), and wherein the following Condition 3 is satisfied:

$$3 < TTL/BFL < 4.5. \hspace{2cm} \text{[Condition 3]}$$

6. The optical system of claim 1, wherein an effective focal length (EFL) of the optical system is greater than 10 mm.

7. The optical system of claim 1, wherein the optical system has F-number smaller than 3.8.

8. The optical system of claim 1, wherein the optical system has a chief ray incidence angle (CRA) of less than 40.

9. The optical system of claim 1, wherein the first lens has a positive refractive power, and wherein an image-side surface of the first lens has a concave shape on the optical axis.

10. The optical system of claim 1, wherein the fifth lens has a positive refractive power, and wherein an object-side surface of the fifth lens has a convex shape on the optical axis.

11. The optical system of claim 1, wherein an object-side surface of the third lens has an inflection point.

12. The optical system of claim 1, wherein an absolute value of a focal length of the fifth lens is greater than a sum of absolute values of focal lengths of the first to fourth lenses.

13. The optical system of claim 1, wherein a focal length of the fifth lens is f5, wherein a focal length of the optical system is an effective focal length (EFL) and wherein the following Condition 4 is satisfied:

$$20 < f5/EFL < 50. \hspace{2cm} \text{[Condition 4]}$$

14. The optical system of claim 1, wherein the second lens has a negative refractive power.

15. The optical system of claim 14, wherein an object-side surface of the second lens has a concave shape on the optical axis, and wherein an image-side surface of the second lens has a convex shape on the optical axis.

16. The optical system of claim 1, wherein the third lens has a negative refractive power.

17. The optical system of claim 1, wherein an object-side surface of the third lens has a concave shape on the optical axis, and wherein an image-side surface of the third lens has a concave shape on the optical axis.

18. The optical system of claim 9, wherein the fourth lens has a positive refractive power, wherein an object-side surface of the fourth lens has a convex shape on the optical axis, and wherein an image-side surface of the fourth lens has a concave shape on the optical axis.

* * * * *